Patented Jan. 28, 1941

2,229,649

UNITED STATES PATENT OFFICE 2,229,649

SULPHATED METHYL HEPTADECENYL CARBINOL

Fritz Guenther, Ludwigshafen-on-the-Rhine, Hans Haussmann, Mannheim, Joseph Nuesslein, Frankfort - on - the - Main, Hermann Schuette, Mannheim, and Conrad Schoeller, Ludwigshafen-on-the-Rhine, Germany, assignors, by mesne assignments, to General Aniline & Film Corporation, New York, N. Y., a corporation of Delaware No Drawing. Application May 28, 1936, Serial No. 82,312. In Germany April 13, 1929

1 Claim. (Cl. 260—459)

This application is a continuation-in-part of our application Ser. No. 442,716, filed on April 8, 1930.

The present invention relates to new assistants in the textile and related industries, especially wetting, cleansing and dispersing agents and particularly to sulphated methyl heptadecenyl carbinol.

We have found that most valuable assistants for the textile and related industries, especially wetting, cleansing and dispersing agents, are obtained by treating non-primary, i. e. secondary or tertiary, aliphatic alcohols containing in the molecule at least 8 carbon atoms but no primary hydroxyl group and no (free or neutralized) carboxylic group with a sulphonating agent, thus converting the said alcohols into the corresponding acid sulphuric acid esters. The expression "non-primary aliphatic alcohols" means that the alcohols to be treated should contain no primary hydroxyl group in their molecule and that also besides the said alcohols primary alcohols should not be present. Suitable initial materials are for example simple secondary or tertiary aliphatic alcohols with at least 8 carbon atoms, or aliphatic ketones or ethers with the said number of carbon atoms which contain at least one secondary or tertiary hydroxyl group. Such initial materials are for example alcohols in which to the hydroxyl-bearing carbon atom three aliphatic radicles (which may be saturated or unsaturated hydrocarbon radicles or substituted hydrocarbon radicles or radicles interrupted by hetero atoms or hetero groups or which may be cyano groups) or one hydrogen atom and two aliphatic radicles of the said kind may be attached, at least one of the said radicles containing at least 6 carbon atoms so that the sum of the carbon atoms in the whole molecule is at least 8. Single alcohols of the said kind may be employed as well as mixtures of several ones. For example alcohols are very suitable which contain besides one hydrogen atom and one lower alkyl radicle (such as methyl, ethyl, propyl, butyl and amyl) or besides two lower alkyl radicles a decyl, dodecyl, heptadecyl, octadecyl, heptadecenyl or octadecenyl radicle attached to the hydroxyl bearing carbon atom. Alcohols containing more than one higher molecular aliphatic radicle may also be started with.

The alcohol mixtures obtainable by converting acid oxidation products of paraffin wax, montan wax, high molecular petroleum fractions, etc., into ketones and hydrogenating the latter may also be employed with advantage. Furthermore mixtures of secondary or tertiary alcohols containing radicles corresponding to the alcohols obtainable by hydrogenating naturally occurring fatty acid mixtures of vegetal origin, for example the fatty acids of palm kernel oil, coconut oil, linseed oil, soy bean oil, train oil, sperm oil, tallow, chlorinated tallow and the like may be mentioned as suitable initial materials. Carbinols obtainable by reacting organo metallic compounds of the type of Grignard's reagents with higher molecular acids, their esters or chlorides or with ketones or aldehydes may also be employed for the sulphonation. The cyano hydrines of ketones or aldehydes are also suitable.

As examples of suitable alcohols may be enumerated methyl heptadecyl carbinol, ethyl dodecyl carbinol, dimethyl hepta decenyl carbinol, diethyl dodecyl carbinol and alcohol mixtures corresponding to the formula

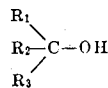

wherein $R_1$ is hydrogen or a lower alkyl radicle, $R_2$ a lower alkyl radicle and $R_3$ an alkyl corresponding to the alcohols obtainable by reduction of the fatty acids of palm kernel oil or coconut oil.

The sulphonation may be carried out with sulphuric acid, for example with sulphuric acid monohydrate, or also with stronger sulphonating agents, such as sulphur trioxide, oleum or chlorosulphonic acid. Aminosulphonic acid, pyrosulphates in pyridine and the addition products of sulphur trioxide on pyridine are also suitable sulphonating agents. The temperature of sulphonation will generally not considerably exceed 100° C. The sulphonation may be carried out in the presence of catalysts and of diluents, such as carbon tetrachloride, trichlorethylene, nitrobenzene, acetic acid and the like and/or in the presence of agents removing water, such as anhydrides or chlorides of organic or inorganic acids. The quantity of sulphonating agent usually corresponds to at least one molecular proportion of sulphonating agent per each molecular proportion of the non-primary alcohol; but if the sulphonation is carried out with strong sulphonating agents, such as sulphur trioxide or chlorsulphonic acid, or with mixtures of milder sulphonating agents with the strong sulphonating agents or with agents removing water, the quantity of the strong sulphonating agents or of the agent splitting off water should preferably not exceed one molecular proportion for each hydroxyl group.

The products obtained are characterized by equally good wetting power in neutral, acid or alkaline liquors. The products also have a high stability against substances which produce the hardness of water, so that they constitute highly valuable assistants in the treatment of textiles of any kind, such as single fibres, yarns, fabrics of animal, vegetable and synthetic origin and in the production of preparations for the said purposes and for any other emulsifying or dispersing purposes as, for example in the production of coating preparations, inks and the like.

The sulphuric esters of the secondary or tertiary alcohols may be employed as such or in the form of their water-soluble salts, i. e. their salts with suitable inorganic bases such as alkali metal hydroxides and ammonia or organic bases such as mono-, di- or trimethylamine, butylamines, ethylenediamine, dodecylamine, aniline, mono-, di- and triethanolamine etc.; the esters or their salts may be employed as such or in conjunction with other wetting or emulsifying agents such as soaps, products of the type of Turkey red oils, sulphonic acids of aliphatic or aromatic and particularly of polynuclear compounds, or their salts, or with protective colloids such as glue, gelatine or vegetable mucilages or gums. Salts as for example soda, sodium bicarbonate, waterglass, common salt, neutral or acid sulphate, sodium borate or organic solvents, for example glycol ethers, such as monocresyl ethylene glycol ether, cyclohexanol or cyclohexanone, trichlor ethylene, or bleaching agents such as perborates, percarbonates, para-toluene sulphonic chloramide sodium may be added. The said agents are employed in quantities depending on the desired purpose and several of them may be added conjointly. The agents may be employed together with sulphuric acid esters of primary alcohols. Thus for example the quantity of these additions may be the same as that of the sulphuric esters or their salts or considerably higher depending on the purposes of emulsifying, wetting, washing, cleansing or dispersing solid water-insoluble materials in water. In baths for the treatment of textiles the quantity of the sulphuric esters or their salts may be as low as a few per cent, say up to about 10 per cent, or even a few per thousand of the whole liquors.

The sulphuric acid esters or the water-soluble salts of the alcohols defined above have an excellent washing action, and in this respect may serve in many cases as complete substitutes for soap without having the objections of soap, that is its sensitivity to acids and lime and its alkaline reaction. For example, by the aid of these products, raw wool may be degreased in a simple manner in completely neutral liquors. With piece goods the said substances effect a far-reaching improvement in the washing process, which may be carried out in a shorter period of time and while excluding alkali. The careful maintenance of a low washing temperature which is necessary with woolen goods by reason of the possibility of injury by alkalies, is no longer necessary when using the washing agents according to this invention. Furthermore, the lengthy rinsing necessary when employing soaps may be dispensed with.

The valuable effect of the sulphuric esters and their salts is, however, highly valuable also in other processes of improving textiles. Thus for example single fibres and yarns or fabrics can be sized or weighted with preparations of the usual sizes containing the sulphuric esters or their salts and the products show a soft touch and suppleness which cannot be obtained without the said additions of sulphuric ester. The same good effects are obtained when the sulphuric esters or their salts are employed for the preparation of emulsions for oiling or impregnating fabrics. On account of the efficiency of the sulphuric esters and their salts even in acid baths the processes of carbonizing, fulling, dyeing in acid baths and the like may be easily performed without precipitation of solid matter. In all these processes the final products obtain a soft touch and suppleness, which valuable properties may be conveyed to hard or stiff materials already by treating such materials with solutions of the sulphuric esters. Thus for example organsin silk can be rendered soft and supple by treating it for about 1 hour with a hot about 0.5 per cent aqueous solution of the sulphuric ester of heptadecyl methyl carbinol and the dry silk shows besides a full soft touch an increase by weight of about 10 per cent. such weighting occurring usually when animal fibres are treated with the solutions of the sulphuric esters. Even wool dyed with metal compounds of organic dyes can be rendered soft and elastic by adding a small quantity of one of the sulphuric esters to the baths in which the dyestuffs on the fibres are converted into their metal compounds. Besides this, the bad results in dyeing with badly levelling dyestuffs can be avoided by incorporating the dyestuffs before their application, or the baths, with the sulphuric esters or their salts.

In dyeing mixed fabrics of cotton, or artificial silk, and wool, or silk, with substantive dyestuffs, the previously dyed wool or silk also becomes appreciably colored by the substantive dyestuff, even when maintaining moderate temperatures, so that undesirable mixed dyeings and discolorations are obtained.

This objection is obviated by introducing into the dye bath, serving for dyeing the cotton or artificial silk fibres of the mixed fabric, acid sulphuric esters, according to the present invention or water-soluble salts of the said esters. In this manner the dyeing of the wool or the silk of the mixed fabric by the substantive dyestuff is to a great extent prevented without the absorption of the dyestuff by the fibres of cellulose or its derivatives such as viscose or also cellulose esters such as nitrocellulose, being injuriously influenced.

When working in this manner a disagreeable discoloration of the animal fibres is avoided without impairing the dyeing effect on the cellulose fibres.

The following examples will further illustrate the nature of this invention but the invention is not restricted to these examples. The parts are by weight.

*Example 1*

100 parts of pentatriacontanol, obtainable by reduction of stearone are treated with 100 parts of fuming sulphuric acid containing 23 per cent of sulphur trioxide until the product is soluble in water. The reaction mass is then poured onto ice, neutralized and the product is then recovered by salting out. It possesses a particularly high emulsifying power.

*Example 2*

50 parts of the alcohol mixture obtainable by catalytically hydrogenating the ketone mixture corresponding to the formula $R-CO-CH_3$ (wherein $R-CO-$ means the acyl radicle of the fatty acids contained in palm kernel oil) are sulphonated at from 10 to 15° C. with a solution of 28 parts of chlorosulphonic acid in 21.6 parts of anhydrous diethyl ether. As soon as the sulphonation is completed the reacted mixture is poured onto ice and neutralized with caustic soda solution. The product obtained by evaporation and drying is a readily soluble cleansing agent very stable to calcium compounds and especially suitable for washing wool.

Example 3

50 parts of the alcohol mixture obtainable by catalytic hydrogenation of the ketone mixture corresponding to the formula R—CO—CH$_3$ (wherein R—CO— means the acyl radicle of the completely hydrogenated fatty acids contained in train oil) are sulphonated at from 10 to 15° C. by means of a solution of 22 parts of chlorosulphonic acid in 14.4 parts of diethyl ether. The reaction mixture is poured onto ice and neutralized by means of caustic potash solution. The product has an excellent washing power and is stable to calcium compounds. For example it is far superior in these properties to the corresponding primary alcohol sulphonates and also to sulphonates of alcohols containing in the molecule a primary and a secondary hydroxyl group such as octodecandiol.

Products of similar properties are obtained if instead of the above mentioned alcohol mixture the alcohols are employed which may be prepared by hydrogenating the corresponding ketones in which R—CO— means the acyl radicle of stearic acid or palmitic acid.

Example 4

50 parts of the alcohol mixture obtainable by hydrogenating a ketone mixture corresponding to the formula R—CO—CH$_3$ (wherein R—CO— means the acyl radicle of partially hydrogenated train oil fatty acids) which alcohol mixture has an iodine number of 55.7, are sulphonated with the solution of 22 parts of chlorosulphonic acid in 14.4 parts of diethyl ether at from 10 to 15° C. The reacted mixture is neutralized with caustic soda solution whereby a washing agent is obtained which is excellently suitable for washing wool soiled with fat.

Instead of the alcohol mixture mentioned above obtained by starting with partially hydrogenated train oil fatty acids the corresponding material derived from the fatty acids of sperm oil can be employed, similar products thus being produced.

Example 5

50 parts of heptadecenyl methyl carbinol (obtainable by hydrogenating heptadecenyl methyl ketone) are sulphonated by means of a solution of 25 parts of chlorosulphonic acid in 14.4 parts of diethyl ether. By neutralizing with caustic soda solution an agent excellently suitable for washing wool is obtained. Other water-soluble salts such as the potassium, ammonium, mono-, di- or trimethylamine or mono-, di- or triethanol amine salts are also suitable.

Example 6

50 parts of oleic aldehyde cyanhydrin are sulphonated at room temperature by means of a solution of 25 parts of chlorosulphonic acid in 14.4 parts of diethyl ether. By neutralization with caustic potash solution a valuable washing agent is obtained which has an excellent stability to lime.

Example 7

70 parts of methyl-n-heptadecenylcarbinol or the corresponding amount of methylundecylcarbinol (see Pickard and Kenyon, Journ. Chem. Soc. 99, (1911) page 58, line 10) or of ethyl-n-pentadecylcarbinol (see Journ. Chem. Soc. 103 (1913), page 1953, lines 3 et seq.) are dissolved in 60 parts of diethylether and sulphonated at from 15° to 20° C. by means of a solution of 32 parts of chlorsulphonic acid in 60 parts of ether. The sulphonation product is neutralized with caustic soda solution. By dissolving the product in 5000 parts of water a solution is obtained which is especially suitable as a wetting agent for unbucked cotton in the heat. The said solution may be directly employed as a bucking bath after the addition of the adequate amount of alkali without any further previous wetting of the cotton.

Example 8

30 parts of dimethylpentadecylcarbinol (see Ipatiew and Grawe, Chem. Zentralblatt 1901, II, page 1201) or dimethylheptadecenylcarbinol are sulphonated with 15 parts of chlorsulphonic acid and 20 parts of diethyl ether and the sulphonation product is neutralized with caustic soda solution. An 0.4 per cent solution of the sodium salt thus obtained is excellently suitable for washing wool soiled with fatty oils, for example at 50° C.

Example 9

α-Hydroxypalmitylcyanide (see Le Sueur, Journ. Chem. Soc. 87 (1905) page 1893, line 12) is sulphonated at ordinary temperature by means of a mixture of ether and chlorosulphonic acid, the latter being employed in a slight excess over the theoretical amount. The product is neutralized with caustic soda solution.

An 0.6 per cent solution of the sodium salt thus obtained is suitable for washing at 100° C. household linen soiled with pigments. Even if water of ordinary hardness is employed no precipitate of calcium soaps is formed on the linen. It is not necessary to add to the bath sodium carbonate which is especially injurious to linen.

Example 10

Oxidized train oil fatty acids are subjected to distillation. Those parts which distill over between 80 and 175° C. at 12 millimeters mercury gauge consist mainly of fatty acids with 5 to 12 carbon atoms in the molecule. 100 parts thereof are ketonized according to application Ser. No. 682,670. The ketones formed are subjected to distillation and hydrogenated at 200° C. under 200 atmospheres in the presence of 2 per cent of metallic cobalt. The hydroxyl number of the product is about 230. It is sulphonated by means of chlorosulphonic acid and the sulphonation product is neutralized with caustic soda solution. After inspissation there remains behind a paste containing about 100 parts of pure sulphonate and possessing an excellent washing and foaming power.

Example 11

The fatty acids, ester-like derivatives and anhydrides thereof obtainable in the oxidation of hard paraffin are distilled, 12 per cent distilling over as the first runnings having an acid number of 300 and a saponification number of 355. 100 parts of this fraction are ketonized according to application Ser. No. 682,670, freed from iron compounds by means of sulphuric acid, washed and hydrogenated at 200° C. under a pressure of 50 atmospheres in the presence of a copper-manganese-zinc catalyst. The alcohols thus obtained are distilled, sulphonated with diethylether chlorsulphonic acid, neutralized with caustic soda solution, treated several times with benzine in order to remove the unsulphonated parts, and inspissated. A practically colorless mass remains behind which contains about 85 parts of pure sulphonate; its washing and foaming power surpasses that of the sulphonate of the alcohols obtainable by reduction of coconut oil fatty acids.

Example 12

50 parts of the tertiary carbinol obtainable by reacting ethyl magnesium bromide with olive oil are dissolved in 30 parts of diethylether and sulphonated at from 10 to 15° C. by means of a solution of 25 parts of chlorosulphonic acid in 20 parts of ether. After neutralization with caustic soda solution small amounts of impurities are removed by extraction with petrol ether. After suitable dilution the neutral solution of the sulphonation product obtained may be employed with advantage for washing wool.

Example 13

Hanks of artificial silk from viscose are treated with about 20 times their weight of a solution of 2 parts of the sodium salt of the sulphuric ester obtained according to Examples 2 and 3 in 100 parts of water for 10 minutes at room temperature. The hanks are then centrifuged and dried and possess a very soft, smooth and supple touch.

Example 14

In the production of dyeings with the aid of aniline black or similar pigment dyes by the one-bath or oxidation method an addition of from 1 to 10 grams of the sulphuric esters referred to in Examples 4 and 5 to each liter of the dyeing liquor furnishes a considerable improvement of the dyeings as regards their fastness to rubbing. The aforesaid quantities of sulphuric ester may be added for example to a concentrated solution containing aniline salt in a quantity of 10 per cent by weight of the goods to be dyed and the solution is then added to the liquor containing 10 cent of potassium chromate, and 8 per cent of sulphuric acid of 60° Bé. strength or a mixture of 5 per cent of sulphuric acid of 60° Bé. strength and 4 per cent of hydrochloric acid of 20° Bé. strength. Hanks dyed in this manner show a fastness to rubbing considerably higher than that of hanks dyed in the same manner without the addition of sulphuric ester.

What we claim is:

A compound selected from the group consisting of the acid sulfuric acid ester of methyl heptadecenyl carbinol and of a water-soluble salt of said ester.

FRITZ GUENTHER.
HANS HAUSSMANN.
JOSEPH NUESSLEIN.
HERMANN SCHUETTE.
CONRAD SCHOELLER.